Jan. 3, 1950 — M. J. SMITH ET AL — 2,493,271
VALVED HOSE COUPLING
Filed June 19, 1948

Milton J. Smith
Herbert J. Shane
INVENTORS

BY
Glenn L. Fish
ATTORNEY

Patented Jan. 3, 1950

2,493,271

UNITED STATES PATENT OFFICE 2,493,271

VALVED HOSE COUPLING

Milton J. Smith and Herbert J. Shane,
Wenatchee, Wash.

Application June 19, 1948, Serial No. 33,984

3 Claims. (Cl. 284—18)

Our invention relates to the general class of valved joints for pipe and hose couplings, and more specifically to an improved valved hose coupling employing a rotary plug valve of the ball and socket type as a hinge unit in a flexible detachable joint.

While the improved valve coupler of our invention is well adapted for various purposes and uses, it is especially designed as a connection in air, oil, water and other similar lines conveying fluid streams under high pressure, by means of which the flow is automatically cut off as the coupling is disconnected. In carrying out our invention we utilize a minimum number of parts that may be manufactured with facility at low cost of production, and the parts may be assembled with convenience, to assure a joint that may be installed with ease, and the coupling may quickly be manipulated for opening and closing the connection between two sections of hose or pipes.

Our invention resides in certain novel features of construction and combinations and arrangements of parts as well hereinafter be described and more particularly set forth in the appended claims. In the accompanying drawings we have illustrated a complete example of a physical embodiment of our invention in which the parts are combined and arranged in accord with one mode we have devised for a practical and satisfactory embodiment of the invention. It will however be understood that changes and alterations are contemplated and may be made in these exemplifying drawings and mechanical structures, within the scope of our claims, without departing from the principles of the invention.

Figure 1:
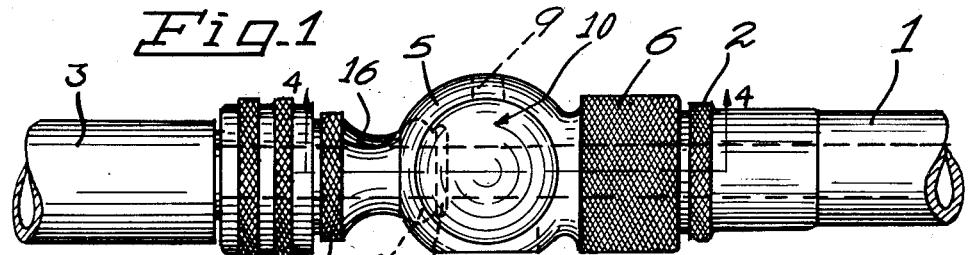
Figure 1 is a side view of a valved joint between two hose-sections in which our quick-acting coupler is embodied.

In Fig. 1 where the adjoining ends of a standard type of hose is shown, the section 1 at the pressure side of the joint is provided with a threaded nipple 2, and the alined hose section 3 is provided with a threaded rotary nut 4, for connection with the interposed coupler.

The flexible valved coupler includes a somewhat spherical and hollow head 5 having a bell end or socket 6 that receives the nipple 2 with a usual packing washer or gasket 7, and this coupling member, which is relatively stationary, is provided with a duct 8 between the interior of the hollow head and the socket 6, and an exhaust or outlet port 9 in the upper portion of the head is disposed perpendicularly to the duct 8, or an angle of ninety degrees therefrom.

The hollow head forms an open seat for a tapered rotary or oscillatable plug valve 10 mounted transversely of the direction of flow through the joint or coupler, and the valve is retained in operative position by means of a journal stud 11 extended through a bearing hole in the head and secured with a washer 12, and lock nut 13 on the exterior threaded end of the stud.

Figure 2:
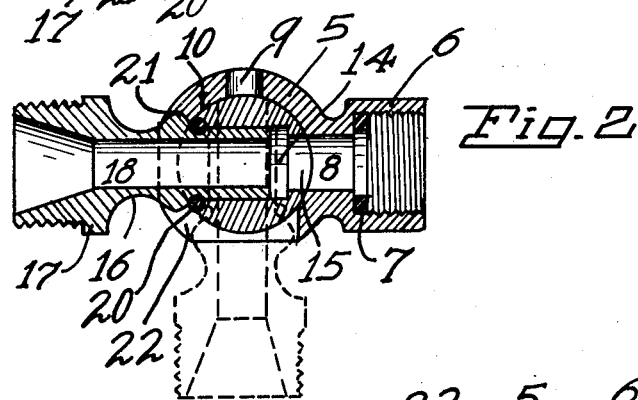
Figure 2 is a longitudinal vertical sectional view through the coupling, as at line 2—2 of Fig. 3, showing by dotted lines the position of one of the coupling members when the joint is disconnected.
Figure 3:
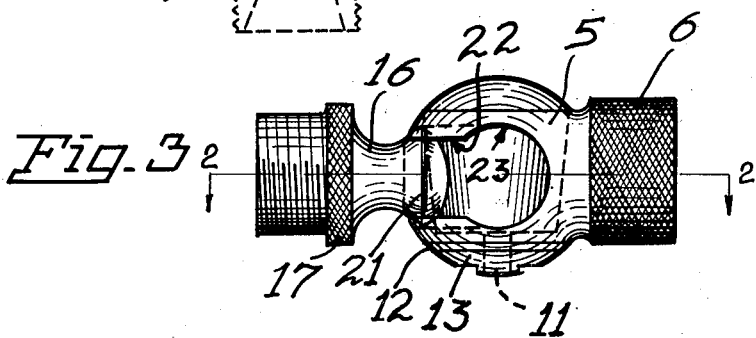
Figure 3 is a bottom plan view of the coupling.
Figure 4:
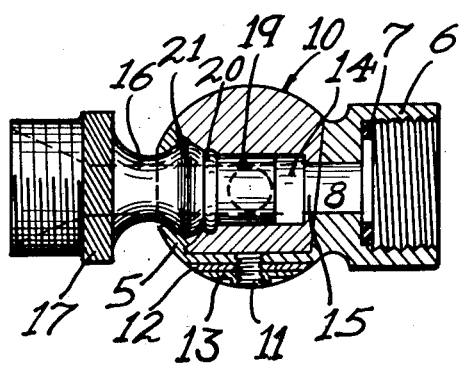
Figure 4 is a sectional view at line 4—4 of Fig. 1 with the coupling member forming the valve stem in full side view.

The plug valve is provided with a transverse opening 14 that terminates at one end in a port 15 alined with the duct 8 when the joint is made, and this port registers with the exhaust port 9 when the coupling is disconnected as shown by dotted lines in Fig. 2.

The relatively movable coupling member 16, which forms an operating stem for the partially rotatable valve, is provided at its outer end with a threaded nipple 17 for engagement with the nut 4 of the hose, and the duct 18 of this member is extended through an integral tubular stem 19 that may be fitted into the opening 14 of the valve while the parts are in the dotted position of Fig. 2. To prevent leaks, the tubular stem is packed with an annular washer 20 seated in a complementary groove of the valve, and the stem is fashioned with an annular shoulder 21 bearing against the washer. This shoulder co-acts with the undercut side walls of an arcuate slot 22 of the hollow head, and the slot, at the underside of the head, terminates in an enlarged circular opening 23 of ample size to accommodate the annular shoulder when the stem is being fitted in the valve. By co-action of the annular shoulder and the undercut side walls of the grooved-slot the movement of the valve stem is guided and retained in proper position and the packing for the valve is compressed against leaks.

To disconnect the joint, the two coupling members are manipulated to swing the member 16 through an arc of ninety degrees to dotted position of Fig. 2, thus turning the valve to closed position, and then the coupling member 16 with its stem may be pulled out through the opening 23.

To again connect the coupling members, the valve stem of the movable coupling member 16, in dotted position, is inserted through opening 23 into the closed valve, the member 16 is then swung upwardly through an arc of ninety degrees and into alinement with the relatively stationary member, thus opening the valve for flow of a stream from right to left in the figures of the drawing.

Having thus fully described our invention, what we claim as new and desire to secure by Letters Patent is:

1. In a separable valve joint for hose, the combination with a coupling member including a hollow head having a duct, a spaced exhaust port and a diametrically arranged arcuate guide slot, of a rotary plug valve having a port for alinement with the duct and mounted in the head, and a detachable coupling member having an open-end tubular stem fitted within and adapted to swing the valve to closed position with its port registering with the exhaust port, for disjointing the detachable member.

2. In a quick-acting and valved hose coupling, the combination with a coupling member having a hollow head and a connecting duct, and a rotary plug valve having a transverse opening and a port registering with the duct, of a detachable coupling member having a tubular stem fitted within said opening, an exterior packing ring on the stem co-acting with the valve, an annular bearing shoulder on the stem engaging the ring, and said head having an arcuate slot for guiding the movement of the stem.

3. In a quick-acting and valved hose coupling, the combination with a coupling member including a hollow valve head having an exhaust port a spaced arcuate slot having undercut walls terminating in an opening, and a rotary plug valve mounted in the head, of a detachable coupling member having a tubular stem fitted within and adapted to swing with the valve, an exterior packing ring on the stem co-acting with the valve, and an annular wedge-shaped bearing shoulder on the stem engaging the ring and guided by said walls.

MILTON J. SMITH.
HERBERT J. SHANE.

REFERENCES CITED

The following references are of record in the file of this patent:

UNITED STATES PATENTS

| Number | Name | Date |
|---|---|---|
| 141,620 | Barton, Jr. | Aug. 12, 1873 |
| 848,223 | Campbell | Mar. 26, 1907 |
| 888,331 | Ingalls | May 19, 1908 |